3,336,493
HIGH FREQUENCY ELECTRIC DISCHARGE CELL
FOR USE IN GAS CHROMATOGRAPHY
Charles Lambert, Liege, Belgium, assignor to L'Air
Liquide, Societe Anonyme pour l'Etude et l'Exploitation
des Procedes Georges Claude
Filed June 7, 1965, Ser. No. 461,811
Claims priority, application France, June 23, 1964,
979,315, Patent 1,407,759
12 Claims. (Cl. 313—231)

This invention relates to an ionisation cell which more particularly permits the analysis of gases by the process which forms the subject of French Patent No. 1,062,975 of September 15, 1952. The characteristics of this cell make it particularly advantageous for gas phase chromatography carried out at atmospheric pressure or at a lower pressure, in the case where the volume of the sample is small, for example, a few cubic centimetres, and where the rate of flow of carrier gas is small, for example, a few litres per hour.

The cell according to the invention is characterised in that the free volume which it offers to the gas is small and in that the gas is not in contact therein with any element which conducts electricity and is brought to a high potential with respect to the mass.

The shape of the electrodes can easily be chosen so that the measurements effected on the light produced by the discharge can be satisfactorily reproduced. The light-sensitive measuring element can be applied very close to one wall of the chamber, where the discharge is produced, this avoiding the influence of external radiations and permitting this element to be particularly subjected to the light originating from places where it varies most as a function of the composition of the gas; despite this proximity, the measuring element can be dismantled without interrupting or interfering with the discharge, for example, for examining the appearance of the latter.

The generator which supplies the high-voltage and high-frequency alternating current to the cell must have a frequency and a power adapted to the dimensions of the cell and to the nature of the gas; the frequency and the voltage of its current must be stable, so that only the variation in the nature of the gas in the cell has any influence on the electric discharge, the pressure of the gas being constant. With the cell according to the invention, the gas in the cell is not subjected to the chemical action of the materials of the electrodes and is not adsorbed by the particles sputtered by these latter.

The accompanying figures illustrate diagrammatically and by way of example two cells according to the present invention.

Figure 1:
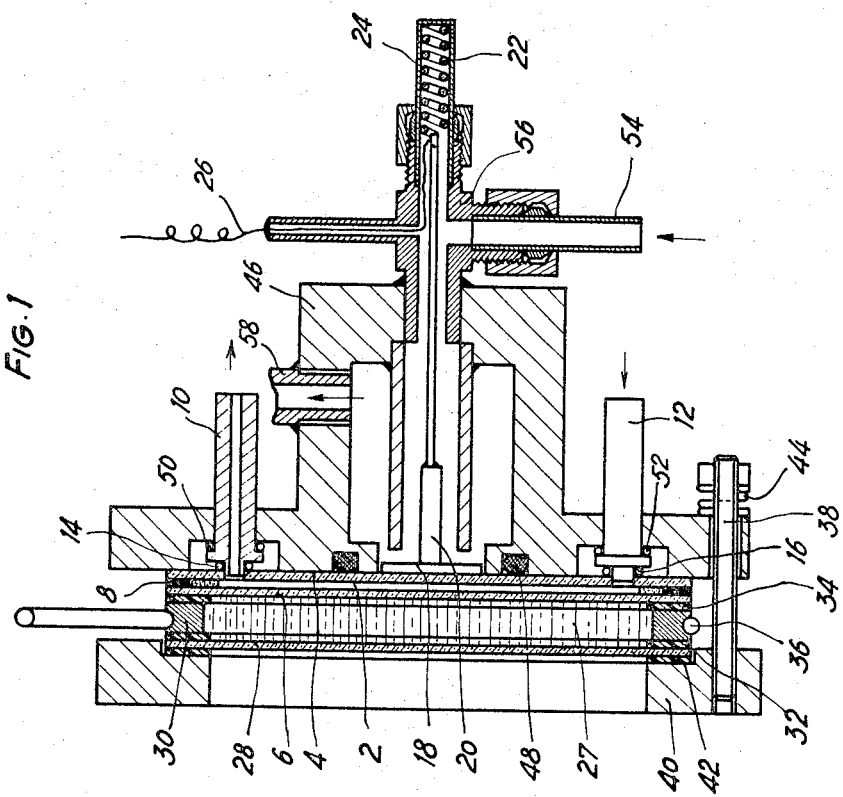
FIGURE 1 is a longitudinal section of a first cell in which the ionisation chamber is flat.

The ionisation chamber 2 of the cell represented on FIGURE 1, is contained between two plates 4 and 6 consisting of insulating material and of which at least that on the left is transparent or translucent. These plates consist for example of glass, silica, etc. The peripheral zones of these plates are connected by a ring 8, consisting for example of glass or silica, which can be fixed thereon by adhesion with epoxide resins or be clamped on these plates with interposition of joints, consisting for example of ethylene polytetrafluoride. The ring can be made of ethylene polytetrafluoride, in which case neither joints nor sticking are necessary. The chamber can also be made in one piece of a transparent or translucent substance.

Two pipes 10 and 12 open into holes in the plate 4 and are made fluid-tight by O-ring packings 14, 16; the pipe 12 serves for the supply of gas and the other for the discharge thereof.

One of the electrodes of the cell is a metal disc 18, prolonged by an extension 20 which terminates in a spring 22; a cap 24, compressing this spring, urges the disc 18 against the plate 4 in a resilient manner so as to adsorb the expansions. A flexible wire 26 connects the electrode 18 to that of the terminals of a high-frequency generator which is not earthed.

The other electrode is formed by a bath of saline water 27 (sodium chloride solution) contained between the plate 6 and another translucent or transparent plate 28, consisting for example of glass. A metal ring 30 is disposed between the peripheral zones of the plates 6 and 28. Packings 32, 34 complete the fluid-tight closure for the bath water 27. The ring 30 comprises two holes (not shown) for the filling and emptying of the bath, these holes being closed after the operation. A tube 36 extends almost completely around the ring 30; either oil or water is caused to circulate in this tube in order to cool the bath 27 through the ring. The terminal of the high-frequency generator which is earthed is connected to the ring 30 and through the latter to the bath 27 the connection being through the tube 36 or by a connection (not shown).

Bolts such as 38 lock a window 40 on the plate 28 by means of a rubber joint 42. The nuts screwed on to these bolts bear by means of springs, such as 44, against a housing 46 made of insulating material located on the side of the electrode 18. The housing 46 is applied to the plate 4 by an O-ring packing 48 and on the pipes 10, 12 by other packings 50, 52. Insulating oil cooled externally of the apparatus enters through one branch 54 of a cross bar fixed on the housing, wets the electrode 18 and leaves the housing through a tube 58. This oil contributes to the cooling of the cell and to the insulating of the electrode 18.

When the wire 26 and the ring 30 are connected to a high-frequency generator of suitable characteristics, a discharge is set up between the electrodes 18 and 27 in the chamber 2. The light of the discharge through the plate 6, the bath 27 and the plate 28 can be observed or measured by means of a photoelectric cell to the left of the cell; by "light," there is understood here the luminous radiations and also ultra-violet or infra-red radiations, which can easily be used. The cell is preferably disposed facing a position of which the luminosity varies most as a function of the nature of the gas. For example, it is possible to arrange a series of cells on a circle at a certain distance around the periphery of the electrode 18.

This cell is also suitable for a measurement using the electrical characteristics of the discharge, for example, the voltage between electrodes, for a current of given frequency and intensity, or the damping caused by the presence of the cell in the high-frequency circuit.

The gas to be observed (carrier gas and a fraction of the specimen to be analysed) is only present in a small volume in this apparatus: the chamber 2 has for example a diameter of 80 mm. and a thickness of 1 mm. In addition this gas is not in contact with any conductive part under voltage; this avoids the soiling thereof by gases or particles originating from elements subjected to an electronic or ionic bombardment or the partial adsorption thereof by particles sputtered by an electrode and deposited on a wall.

Figure 2:
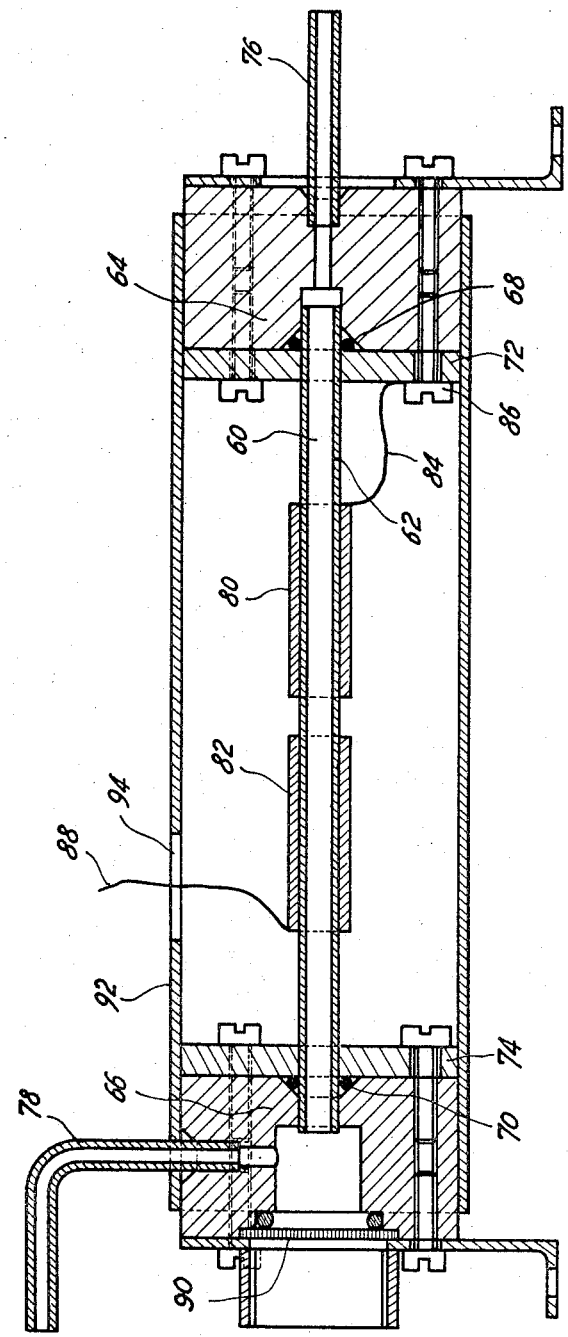
FIGURE 2 is a longitudinal section of a second cell the ionisation chamber of which is narrow and long.

The ionisation chamber 60 of the cell represented on FIGURE 2, is narrow and long.

A hollow cylinder of revolution 62 made of insulating material, for example glass or silica, forms the major part of the wall of this chamber; its two ends are fitted in metal blocks 64, 66, the fluid-tightness being assured by O-ring packings 68, 70 tightened by means of covers 72, 74. A tube 76 supplies the gas to be observed to the chamber 60; another tube 78 permits the discharge of this gas.

Two electrodes 80, 82 surround the central part of the tube 62; these are for example coiled wires. One of these coils 80 is connected by a conductor 84 to one locking screw 86 of the cover 72; it connects this coil, through the mass of the apparatus, to that of the terminals of the high frequency current generator which is connected to earth. The other terminal of this generator is connected to the other coil 82 by a conductor 88; furthermore, it is possible to reverse the roles of the electrodes 80, 82.

In the extension of the tube 62, a translucent or transparent plate 90 affixed to the end member 66, makes it possible to observe or measure the light excited in the gas by the high-frequency electrostatic field produced by the electrodes 80 and 82.

The apparatus also permits of using for the analysis the modifications which the nature of the gas introduces into the electrical characteristics of the discharge.

In this apparatus, as in that of FIGURE 1, the gas which is observed is not in contact with any element under voltage, this preventing it from being soiled or partially absorbed in the cell. The volume of gas which it contains may be small; the tube 62 can be given a length 155 mm. and a diameter of 5 mm.

The spacing between the facing ends of the electrodes 80, 82 is for example 7 mm. if the gas under observation is at atmospheric pressure; the spacing can be increased when this gas is at a lower pressure.

A housing 92 encloses the apparatus; it comprises an opening 94 which permits the wire 88 to pass through and optionally the cooling of the tube 62 by natural or forced ventilation. The casing can also be filled with oil or the latter can even be caused to circulate in order to improve the cooling and the insulation.

The light emitted by the cells of FIGURES 1 and 2 may pass through a filter before being incident on the measuring device; this filter may or may not be fixed to the cell and may even constitute one or more of the plates 6, 28, 90.

What I claim is:

1. A cell for the analysis of a gas comprising wall means for enclosing an ionization chamber having a cavity of small volume, means for continuously flowing gas through said small cavity of the chamber, and a pair of electrodes spatially mounted externally of the cavity of the chamber for producing a high frequency field therein, at least a portion of said wall means being transparent, the ionization chamber comprising a wall about said cavity, and means for continuously flowing an insulating oil over one of the metal electrodes.

2. A device as defined in claim 1 wherein the wall means of the ionization chamber comprises a pair of spaced glass plates.

3. A device as defined in claim 1 wherein one of the electrodes comprises a metal plate and spring means urging said plate into contact with one of the walls.

4. A cell for the analysis of a gas comprising wall means for enclosing an ionization chamber having a cavity of small volume, means for continuously flowing gas through said small cavity of the chamber, and a pair of electrodes spatially mounted externally of the cavity of the chamber for producing a high frequency field therein, at least a portion of said wall means being transparent, the ionization chamber comprising a wall about said cavity, one of the pair of the electrodes comprises a transparent plate spaced from the transparent wall and mounted in fluid tight relation therewith to define a terminal chamber, an electrically conductive liquid contained in said terminal chamber, and an electrical conductor in contact with said liquid.

5. A device as defined in claim 4 wherein the liquid is a solution of sodium chloride.

6. A device as defined in claim 4 further including means for cooling the liquid.

7. A cell for the analysis of a gas comprising wall means for enclosing an ionization chamber having a cavity of small volume, means for continuously flowing gas through said small cavity of the chamber, and a pair of electrodes spatially mounted externally of the cavity of the chamber for producing a high frequency field therein, at least a portion of said wall means being transparent, the ionization chamber comprising a wall about said cavity, the wall means of the ionization chamber forming a cylinder of an electrically insulating material.

8. A device as defined in claim 7 wherein the wall means of said ionization chamber forms a glass tube.

9. A device as defined in claim 7 further including an auxiliary chamber in communication with one end of the tube, and a window in said chamber for viewing the end of the tube.

10. A device as defined in claim 7 wherein each electrode surrounds at least a major portion of the cylinder.

11. A device as defined in claim 9 wherein the means for flowing gas includes a conduit in communication with said auxiliary chamber and another conduit in communication with the other end of the tube.

12. A cell for the analysis of a gas comprising an enclosed ionization chamber having a cavity of small volume, means for continuously flowing gas through said small cavity of the chamber and a pair of electrodes spatially mounted externally of the caivty of the chamber for producing a high frequency field therein, wherein the ionization chamber comprises two parallel, spaced and proximate walls, the one to the other, and connecting walls for joining said parallel walls, said parallel walls being respectively located between said electrodes and said ionization chamber, at least one of said parallel walls and the corresponding electrode being transparent, whereby radiation emitted by the analysis gas issues from the ionization chamber.

References Cited
UNITED STATES PATENTS

| | | | |
|---|---|---|---|
| 2,943,223 | 6/1960 | Fay | 313—231 X |
| 3,055,262 | 9/1962 | Ducati et al. | 315—248 X |

JAMES W. LAWRENCE, *Primary Examiner.*

C. R. CAMPBELL, *Assistant Examiner.*